United States Patent Office 3,717,438
Patented Feb. 20, 1973

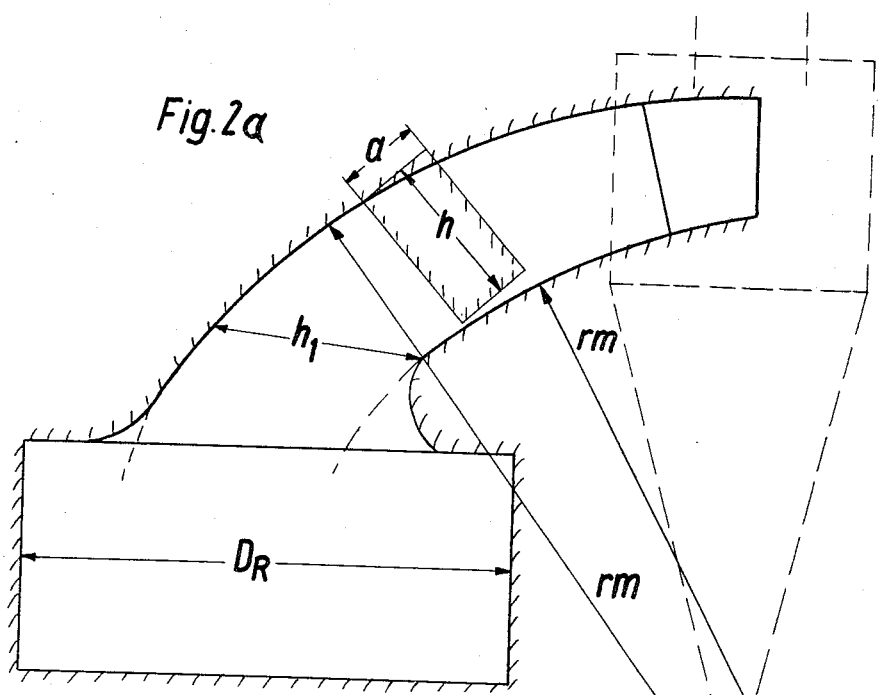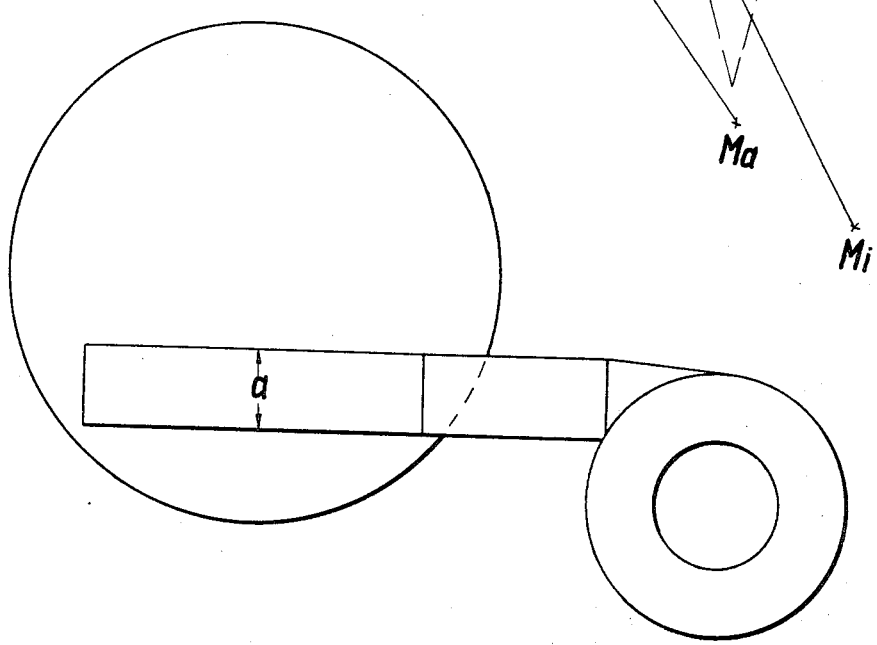

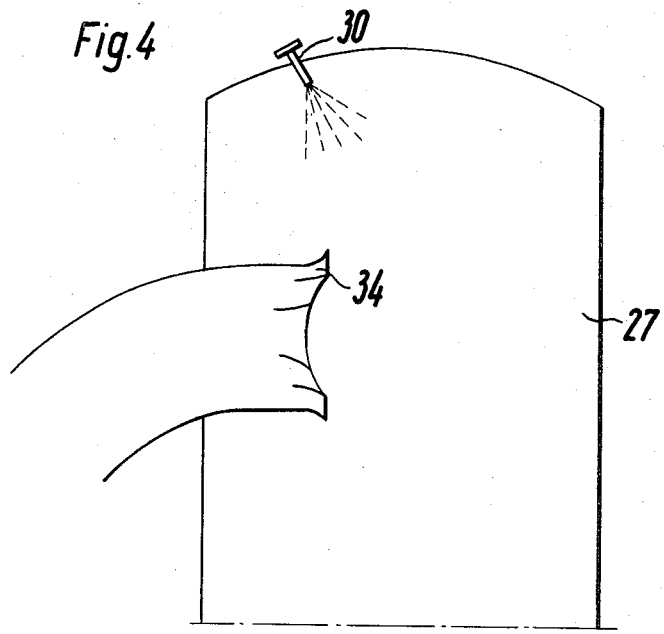
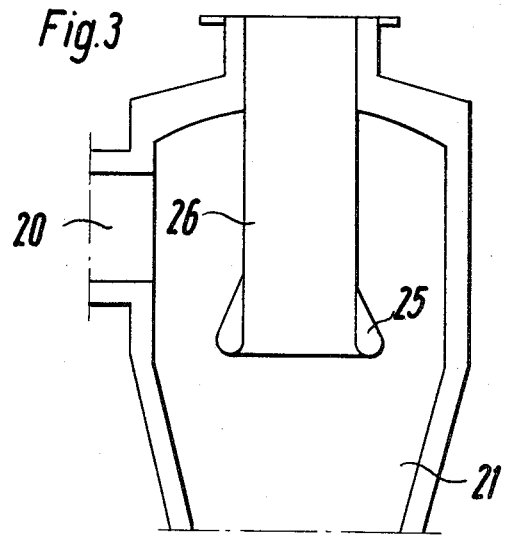

3,717,438
HYDROCARBON CRACKING APPARATUS
Paul Schmalfeld, Bad Homburg, Erich Mosberger, Frankfurt am Main, and Georg Gauch, Gotzenhain, Germany, assignors to Metallgesellschaft AG, Frankfurt, Germany
Filed Oct. 6, 1970, Ser. No. 78,424
Claims priority, application Germany, Oct. 17, 1969,
P 19 52 347.8
Int. Cl. C10g 9/32
U.S. Cl. 23—262
23 Claims

ABSTRACT OF THE DISCLOSURE

Apparatus for cracking high-boiling hydrocarbons to form olefins, with circulating, highly heated, fine-grained heat carriers in a fluidized bed. In the apparatus, the heat carriers are elevated and heated in a vertical pneumatic line, separated from the conveying and heating gases and sorted in a greatly enlarged separator chamber, and supplied through a conduit to the reactor. The reactor has a plurality of individual nozzles provided with individual inlet conduits and extending through the bottom of the reactor to supply the hydrocarbons to be cracked. A lateral outlet is connected to the lower portion of the fluidized bed and serves to return the heat carriers to the conveying and heating line. The connections between the reactor and a cyclone for separating entrained fine-grained heat carriers, and between the cyclone and a quencher, ensure that the flow paths of the cracked gas will be kept free of deposits. The connections comprise a transfer duct between the reactor and the separating cyclone, and a discharge duct between the separating cyclone and the quencher.

BACKGROUND

Figure 1:
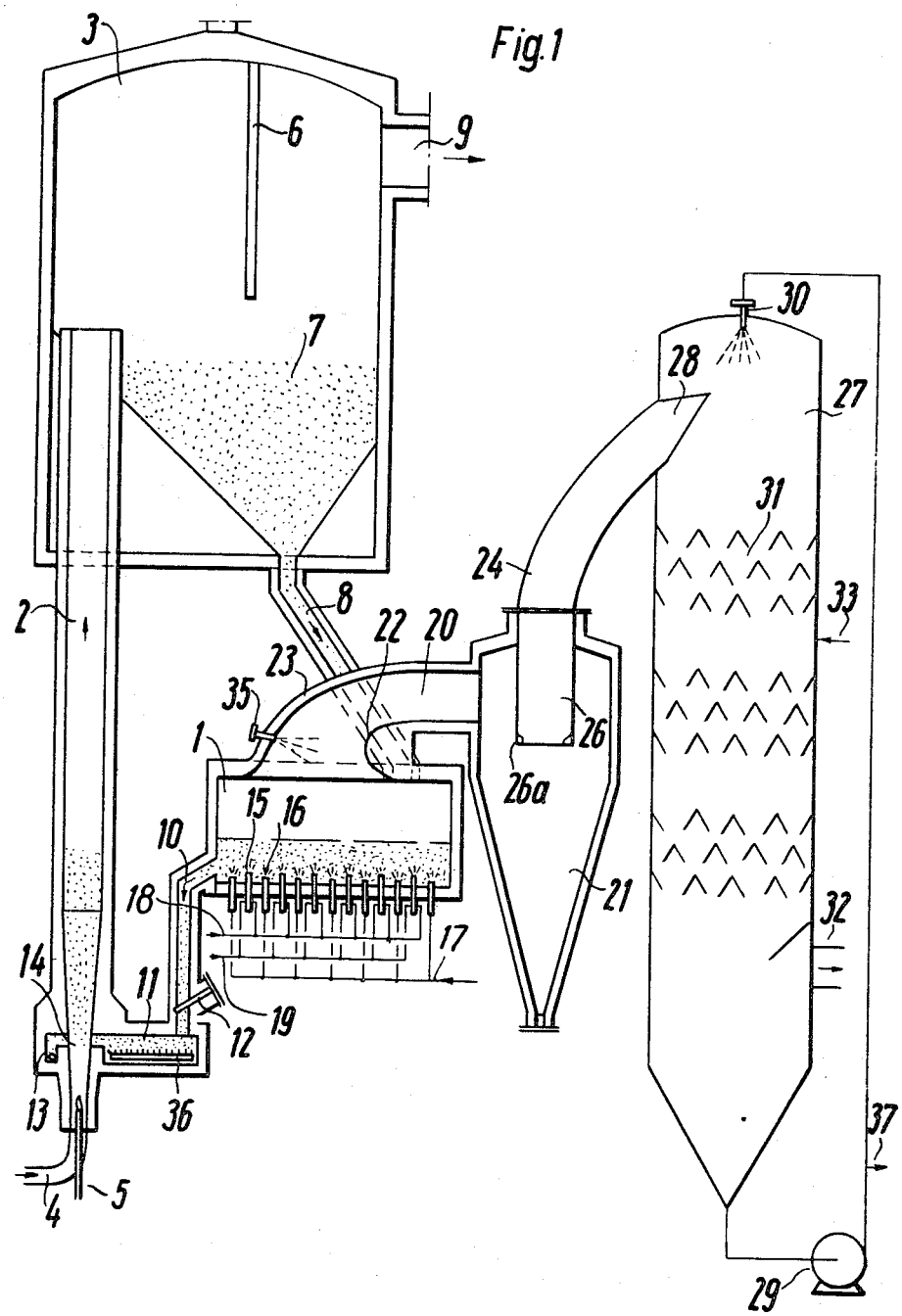

This invention relates to the thermal cracking of hydrocarbons to form lower olefins using indirectly heatable tube heater cracking furnaces and reactors using circulating fine-grained heat carriers.

As the tube heater cracking furnaces were further developed, they were built in units of increasing size and operated under more severe cracking conditions. Their use is restricted, however, to relatively narrow fractions of hydrocarbons having low or medium boiling ranges, such as light gasolines or naphtha.

Cracking processes in which circulating fine-grained heat carriers are employed are particularly suitable for processing hydrocarbons having a very wide boiling range, such as crude oils or high-boiling fractions obtained by the distillation of crude oils or the like.

German Pat. 1,192,186, discloses a reactor for a thermal cracking of hydrocarbons to form lower olefins by means of hot, fine-grained heat carriers. That reactor has been used in practice with success in the cracking of gasoline or kerosene. It has been found, however, that this reactor must be redesigned if it is to be used to process crude oils or high-boiling crude oil distillates and/or is to be operated in a unit having much higher throughputs.

In the cracking of higher-boiling hydrocarbons, it has been found that the distributing system comprising manifolds for distributing the hydrocarbons to be cracked tends to become clogged so that the hydrocarbons are irregularly charged to and distributed over the cross-section of the reactor. It has not been possible to ensure a reasonably uniform distribution of the high-boiling hydrocarbons, which are preheated and at least in part are still liquid, to the manifolds and their outlet openings. As a result of the more rapid formation of coke in the cracking of high-boiling hydrocarbons, the internal structure in the reactor is clogged in shorter intervals of time so that the uniform distribution of the circulating fine-grained heat carrier and its uniform mixing with the flow of the gaseous and vaporous reactants is hindered.

Finally, disturbing deposits of condensing polymer products are formed at the outlet of the reactor and in the conduits which lead from the reactor to the cyclone in which entrained dustlike heat carrier particles are separated, and to the quencher in which oil is circulated.

In addition to those difficulties, a redesign of the system for the circulation of the fine-grained heat carriers has proved necessary in order to avoid larger overall heights in units having a higher throughput, for which larger cross-sections are required. In this case, the structural steelwork used to support the larger units of the circulation system must have unreasonably large dimensions so that it becomes highly expensive.

SUMMARY

It is an object of the present invention to provide an apparatus in which the above-mentioned disadvantages and difficulties are eliminated even in very large units of high capacity. The present invention is directed to a reactor involving a circulation system which comprises a pneumatic conveying line in which the circulating fine-grained heat carriers are heated and a separating chamber for separating and sorting the heated heat carriers.

The reactor of this invention comprises a fluidizing chamber free of internal fixtures, and the bottom of the reactor is preferably flat. A mixture of the hydrocarbons to be cracked and hydrogen is injected into the fluidized bed through a plurality of individual nozzles which are provided with individual inlet conduits which extend through the reactor bottom. The heat carriers are withdrawn from the lower portion of the fluidized bed of the reactor, preferably in a lateral direction, and supplied to the pneumatic conveying line. A transfer duct connects the reactor to a cyclone for separating entrained solid heat carriers and a discharge duct connects the cyclone to a quencher. According to the invention, these ducts are designed so that they remain substantially free of disturbing deposits so that the paths remain open for the flow of the cracked gases. A dip pipe may be suitably provided in the cyclone.

THE DRAWING

The apparatus according to the invention will be explained more fully with reference to the drawings, in which FIG. 1 is an overall view showing the apparatus according to the invention, FIG. 2a is a more detailed view of that portion of the transfer duct 20 between the reactor 1 and the separating cyclone 21 which is deflected into the horizontal and the range of the radius of the bend, FIG. 2b is a top view of the portion of the apparatus shown in FIG. 2a, FIG. 3 shows an alternative design of the structure at the lower edge of the dip pipe 26 in the cyclone 21, and FIG. 4 is a desirable design of the outlet passage 28 of the discharge duct 24 in the quencher 27.

DESCRIPTION

This invention provides apparatus for cracking high-boiling hydrocarbons, particularly crude oils and heavy crude oil distillates, to form olefins, with the aid of circulating, highly heated, fine-grained heat carriers in a fluidized bed. In the apparatus, the heat carriers are elevated and heated in a vertical pneumatic line, separated from the conveying and heating gases and sorted in a greatly enlarged separator chamber, and supplied through a conduit to the reactor.

The reactor of this invention comprises a plurality of individual nozzles provided with individual inlet conduits and extending through the bottom of the reactor and serving to supply the hydrocarbons to be cracked and the process steam. A lateral outlet is connected to the lower portion of the fluidized bed and serves to return the heat carriers to the conveying and heating line. The connections between the reactor and the cyclone for separating entrained fine-grained heat carriers, and between the cyclone and the quencher, ensure that the flow paths of the cracked gas will be kept substantially free of deposits. These connections comprise a transfer duct between the reactor and the separating cyclone, and a discharge duct between the separating cyclone and the quencher. The discharge duct may be provided at its lower end in the cyclone with a dip pipe, if desired. The bottom of the reactor is preferably flat but may be horizontal or inclined.

Referring now to the drawing, FIG. 1 shows a reactor 1, a pneumatic conveying and heating line 2 and a separating chamber 3 for separating the circulating fine-grained heat carriers from the conveying and heating gases. The fine-grained heat carriers, e.g., sand having a particle size of 0.2–1.2 millimeters, are elevated and heated simultaneously in the line 2 by heating gases, which have been formed by a combustion of preferably preheated air, supplied through conduit 4, and fuel supplied through conduit 5, for example, a residual gas or residual oil produced by the cracking reaction. The conveying line 2 opens into the separating chamber 3, which contains a partition 6, by which the gases leaving the conveying line are deflected downwardly and then upwardly and thus release the entrained heat carriers which collect in the collecting portion 7 of the separating chamber and from there flow through conduit 8 in to the reactor 1. The gases are discharged through the conduit 9, subjected to a fine dust collection in succeeding equipment (not shown) and may be utilized to generate steam and preheat the combustion air.

The heated heat carriers are transferred from the collecting portion 7 through conduit 8 into the reactor 1 and flow through and agitate the fluidized bed of the reactor and deliver heat to the hydrocarbons to heat and crack the same and flow through the conduit 10 and the agitating trough 11 back into the conveying line 2. The conduits 8 and 10 are desirably disposed on opposite sides of the reactor. The conduit 10 contains a gate valve 12, which controls the rate at which the heat carriers are withdrawn from the reactor and supplied to the conveying line 2. Perforated pipes 36 are contained in the agitating trough 11 at the bottom thereof and in the annular space 13 which surrounds the conveying line 2 and these pipes agitate and advance the heat carriers and push them through the slot 14 into the conveying line 2.

Two kinds of individual nozzles are provided in the bottom of the reactor, namely, the nozzles 15, through which a mixture of hydrocarbons and process steam flows into the fluidized bed, and the nozzles 16, through which only process steam flows into the fluidized bed. The nozzles 16 are preferably disposed below the nozzles 15, as shown in FIG. 1 and are supplied through the conduit 17 with steam from a central position. A suitable throttle is associated with each nozzle. The throttles in all inlet connections ensure a suitable distribution of the process steam supplied at said rate to the several nozzles and over the fluidized bed. Steam is supplied to the nozzles 16 at such a rate that the velocity throughout for the cross-seciton of the fluidized bed is above the minimum fluidization velocity of the solids to be fluidized.

The nozzles 15 are supplied through conduit 18 with the hydrocarbons to be cracked and through conduit 19 with process steam. Because crude oils or heavy crude distillates are preferably cracked in a heated state, in which they are only partly vaporized, the vapor phase and the liquid phase of the hydrocarbons to be cracked may be separated in a cyclone when they have been preheated. In this case, the liquid phase is conducted through one conduit to part of the nozzles 15 and the vapor phase through another conduit to the remaining part of the nozzles 15. Alternatively, the liquid and vapor phase may be jointly supplied to the nozzles 15. In this case, each nozzle inlet conduit is provided with an orifice plate and all these orifice plates ensure a desired supply to all nozzles connected thereto.

The nozles 15 and 16 and their inlet conduits are fitted through flanged pipes extending through the bottom of the reactor so that these nozzles 15 and 16 can be removed, inspected, and cleaned, if required, in short shutdown periods. Besides, the inlet conduits may be provided with cleaning openings having plug cocks and stuffing-boxes, so that the nozzles may be inspected and cleaned during operation from said stuffing-boxes.

The transfer duct 20 between the reactor and the cyclone 21 begins at the top of reactor 1. This top consists suitably of a suspended ceiling. The cross-section of the transfer duct is tapered (progressively decreases) until it enters the cyclone and the width of the duct is suitably as large as is required at the inlet to the cyclone. The transition from the gas space of the reactor 1 into the transfer duct 20 is highly rounded at 22 to minimize the turbulence due to the acceleration of the gases as they enter the transfer duct.

The transfer duct 20 of the apparatus is shown more fully in FIG. 2. The cross-section of the transfer duct 20 provided between the reactor and the cyclone for the separation of the entrained fine heat carriers consists of an upright rectangle and the height $h$ of said rectangle is continuously decreased. The transfer duct is deflected into a horizontal direction by a bend 23 (FIG. 1) and the radius of curvature of the small side $a$ of the duct cross-section is approximately constant and in the range of $$0.5 \frac{D_R}{a} \text{ to } 0.9 \frac{D_R}{a}$$

or $3h_1$ to $4h_1$, where $D_R$ is the cross-section of the reactor and $h_1$ is the height of the duct at the outlet of the reactor before the beginning of the bend.

In the cyclone 21, any dip pipe 26 which may be used is provided on the inside at its lower edge with a bead 26a, which smoothens the flow into the dip pipe and suppresses eddy currents.

FIG. 3 shows a different design, which serves the same purpose and comprises a flaring bead 25 at the lower edge of the dip pipe 26.

The discharge duct 24 opens laterally into the quencher 27 with an inclination of at least 45° from the vertical. To increase the gas velocity, the discharge duct is tapered to at least one-half of its cross-section at the outlet passage 28. The top of the outlet passage 28 has a larger taper to extend virtually horizontally and protrudes into the quencher 27 so that circulating oil fed into the quencher 27 through the nozzles 30 and serving to quench the hot cracked gases cannot splash into the outlet passage 28 and into the discharge duct 24.

As is apparent from FIG. 4, a diffuser provided with guide vanes 34 may be provided in the quencher 27 at the outlet passage of the discharge duct 24 and serves to equalize the flow out of the duct and thus to avoid deposits.

The circulating oil is fed to the nozzles 30 by means of a pump 29 (FIG. 1) and in a mixture with the cracked gases flows through the plates 31, which may simply consist of a series of angle section bars. The gases leave the quencher 27 through the conduit 32. Fresh circulating oil is supplied into the quencher through conduit 33. Circulating oil is continuously withdrawn from the cycle at a corresponding rate through conduit 37.

Because hydrocarbons and process steam are supplied to the fluidized bed of the reactor by a large number of individual nozzles in a suitable distribution, the reactor may be designed virtually without any limitation as to size. Two, three or four parallel conveying and heating lines 2 and separate conduits 10 and agitating troughs 11 may be connected to a reactor. The reactor 1 may be connected by a plurality of feed conduits 8 to the separating space 3.

To suppress secondary reactions, it is desirable to cool the cracked gases produced in the fluidized bed by about 100° C. as soon as possible. For this purpose, nozzles 35 (FIG. 1) may be provided in the gas space of the reactor 1 or at the inlet to the transfer duct 20. Water may also be supplied through the nozzles 35 and may suitably be atomized by steam. Alternatively, gasoline liquid or vapor may be supplied.

This invention enables a substantial reduction of the overall height of reactors having a large cross-section and the provision of simple means for a uniform distribution of the hydrocarbons to be cracked thoughout the cross-section of the reactor. For this reason, the fluidized bed may have a smaller height, as is desirable for the cracking reaction, and need not be unreasonably high for structural reasons.

The design of the reactor is particularly unique in that nozzles provided with individual inlet conduits and extending through the bottom of the reactor are used to feed the hydrocarbons to be cracked and the process steam. For this reason, the manifold system for charging the hydrocarbons to be cracked need not be arranged in the reactor itself, which contains only the nozzles and the nozzle connections but does not contain the manifolds.

It has also been found desirable to eliminate inclined conduits for feeding the heat carriers from the reactor to the pneumatic conveying lines because the required inclination is at least 55° and involves large overall heights. With the new design of the reactor according to the invention, the inclined conduits are replaced by pneumatic conveyor troughs which are horizontal or slightly downwardly inclined in which the heat carriers are slightly fluidized with suitably peheated conveying air and fed to the annular inlet for the vertical pneumatic conveying line, into which they are forced by the conveying air.

The supply of the hydrocarbons to the individual nozzles, particularly the desirable division of the vaporous and liquid components of the hydrocarbons to be cracked, and the design of the individual nozzles, are preferably in accordance with the disclosure of the German patent application P 16 68 401.8.

The individual nozzles may be supplied with (1) The hydrocarbons to be cracked (a) in the form of vapor, together with process steam, or
(b) in the form of liquid, together with process steam,
(c) in the form of vapor and liquid, together with process steam, or (2) Only with process steam.

In accordance therewith, a first group of individual nozzles are connected to a distributing system for the hydrocarbons to be cracked and to a distributing system for process steam, and a second group of individual nozzles are connected only to a second distributing system for process steam. The individual nozzles of the first group are to be supplied with hydrocarbons to be cracked and with process steam. Part of the nozzles of the first group are fed with hydrocarbons in the form of vapor. Another part of the individual nozzles of the first group are supplied with the non-vaporizable, liquid parts of the hydrocarbons to be cracked. Finally, the hydrocarbons to be cracked may be supplied in the form of vapor and of liquid and together with process steam to the individual nozzles of the first group.

The use of a preferably flat reactor bottom results in the important advantages that conical outlet conduit for the heat carriers is no longer required, so that the overall height is reduced; moreover, that the distributing system connected to the individual nozzles may be disposed outside the reactor, and that the nozzles may be individually removed and inspected without need for a person to enter the reactor, which would have to be cooled for this purpose. If the hydrocarbons are supplied through smooth conduits having simple nozzle orifices, the nozzles may be cleaned during operation or in short shutdown periods from stoking openings in the inlet conduits below the reactor bottom without need for a removal of these nozzles.

The individual nozzles are suitably spaced 100–500 millimeters, preferably 200–300 millimeters, apart. The arrangement may be such that the individual nozzles of the first group are spaced 100–500 millimeters, preferably 200–300 millimeters, apart. The individual nozzles of the second group are then arranged in the spaces between the individual nozzles of the first group.

In one embodiment, the individual nozzles have upwardly directed outlet passages having an included angle of 10–40°, preferably 20–30°. The jet of the hydrocarbons to be cracked and of the steam is preferably directed upwardly. Alternatively, the individual nozzles may be covered and have horizontal or downwardly directed outlet pasages so that the jets of the hydrocarbons to be cracked and of the steam are horizontally directed and radiate to all sides.

The fluidized bed in the reactor has a height of 0.3–2 meters, preferably 0.6–1.2 meters. The mean velocity of the jets of hydrocarbons and/or steam through the height of such beds may be 1–10 meters per second, preferably 3–5 meters per second. With beds having a height of 0.5–2.0 meters, preferably 1.0–1.5 meters, a reaction time of 0.05–2 seconds in the fluidized bed can then be selected. A reaction time of 0.1–0.3 second has proved particularly desirable for a cracking with a highly favorable, high yield of olefins.

The jet from each individual nozzle entrains heat carriers upwardly so that heat carriers disposed over the nozzle outlet enter the jet and heat carriers are circulated. Nevertheless, the movement of the heat carriers in the spaces between the nozzle jets may not always be sufficient so that a stagnation and agglomeration of the heat carriers may occur in the spaces between the individual nozzles in conjunction with deposits of cracked residues. In order to avoid difficulties of this kind, steam is preferably introduced at such a rate through additional openings in the bottom of the reactor between the individual nozzles, or steam is supplied to the individual nozzles of the second group at such a rate, that a velocity which is equal to 1–3 times and preferably 1.5–2 times the minimum fluidization velocity of the fluidized particles is ensured in the fluidized bed of the reactor outside the jets from the nozzles. With heat carriers having usual particle sizes, said minimum fluidization velocity is of an order of 0.2 meter per second.

The use of high-velocity nozzle jets avoids a wild boiling throughout the fluidized bed so that there is no formation of large bubbles in the fluidized bed. Such bubbles would rise to the surface of the fluidized bed and would then burst and cause the heat carriers to shoot upwardly with a formation of fountains. On the contrary, only a relatively calm and continuous upward curvature of the surface of the fludized bed and a moderate upshooting of the heat carriers adjacent to the emerging nozzle jet is observed. The heating and cracking of the hydrocarbons are also rendered more uniform thereby. Because there is no risk of a wild upshooting of the heat carriers, the height of the empty space provided in the reactor above the fluidized bed is virtually independent of the diameter of the reactor and may be small, amounting to 0.5–2.0 meters, preferably 0.8–1.5 meters, so that the residence time of the cracked vapors in that empty space may be less than 0.5 second and secondary reactions are thus suppressed to a high degree. The top of the reactor may be preferably flat and lined with hanger bricks.

A trouble-free operation through periods of many months up to more than a year may be accomplished according to the invention by a design in which the paths for the flow of the cracked gases from the reactor to the quencher are kept substantially free of disturbing deposits. This is enabled in that the transfer duct between the reactor and the cyclone for the separation of entrained dustlike heat carriers and the discharge duct between the cyclone and the quencher are as short as possible and the cracked gases flow through these ducts and to the cyclone at a sufficiently high velocity. A suitable velocity of flow of the cracked gases is between 10 meters and 40 meters per second, preferably 15–25 meters per second.

It has been found that deposits of high-boiling cracked products which result in trouble in the course of time are not only formed on surfaces which promote condensation because they are at a lower temperature than the flowing cracked gases but particularly in regions where dead spaces and turbulence can occur because the flow is retarded. Hence, it is important to provide the ducts with streamlined inlets and outlets so that pronounced turbulence, dead spaces or spaces containing vortex paths are avoided as far as possible.

According to the invention, the inlet cross-section of the cyclone has generally the form of an upright rectangle, through which the cracked gases enter the cross-section preferably at a velocity of 20–25 meters per second. To provide short ducts and to suppress turbulence, the inlet opening between the reactor and the transfer duct according to the invention has also the form of an upright rectangle, through which the cracked gases enter the cross-section preferably at a velocity of 20–25 meters per second. To provide short ducts and to suppress turbulence, the inlet opening between the reactor and the transfer duct according to the invention has also the form of an upright rectangle having rounded edges and receives the cracked gases at a velocity of, e.g., 10 meters per second. The cross-section at the beginning of the transfer duct amounts suitably only to about ¼ to ⅛ of the reactor cross-section. The rectangular transfer duct tapers continuously and is deflected into a horizontal direction before it enters the cyclone. The horizontal smaller side has desirably a constant width. According to the invention, the radius of curvature of the bend should be approximately constant and lie between 0.5 and 0.9 times the quotient of the reactor cross-section and the length of the larger side of the cross-section of the duct or 3–4 times the height of the cross-section of flow before the bend. It has been found that a sharp change in direction between the top of the reactor and the transfer duct promotes a deposition of polymers at the inlet. According to the invention, these deposits may be substantially suppressed if the inlet is not sharp-edged but is approximately parabolically rounded. In that case the velocity of the cracked gases in the empty space above the fluidized bed may be slowly and continuously increased and no break-away eddies are formed, which would promote a formation of polymers. Instead of the strong curvature on the outside at the end of the inlet, the inlet passage may be provided with an inwardly disposed, rounded bead, which merges continuously into the transfer duct.

In accordance with the invention, the cyclone must be specially designed so that a formation of disturbing deposits is substantially suppressed. Such deposits are hardly formed on the outer volute of the cyclone nor at the lower cone but preferably on the outside and inside of the lower portion of the dip pipe. For this reason, a dip pipe is used which in accordance with the invention is provided with beads on the outside or inside of the inlet edge of the dip pipe to direct the flow and to suppress a formation of eddies which would give rise to disturbing deposit of polymers. An ercessive length of the dip pipe should be preferably avoided. The length of the dip pipe should not exceed about one-half of the length of the cylindrical portion of the cyclone.

In another embodiment of the invention, the dip pipe may be omitted. Whereas this will result in a slightly lesser separation action, the separating action will still be better than with a dip pipe in which deposits have formed. It is preferable to omit the dip pipe if the cracked gases flow into the cyclone at a high velocity in the narrow transfer duct and the cyclone has a large diameter of, e.g., 2.5 meters and more. If the dip pipe is omitted, it will be desirable to slightly round the discharge duct at the gas outlet from the cyclone by the provisions of a transition bead in order to improve the directional control of the gas flow in the discharge duct.

Deposits are not only disturbing in the transfer duct between the reactor and the cyclone but even more in the discharge duct between the cyclone and the quencher. Whereas the entrained dustlike heat carriers result in a certain purification in the transfer duct before the cyclone there is no such effect in the discharge duct behind the cyclone because most of the entrained heat carriers are removed in the cyclone. For this reason, a desirable design of the discharge duct between the cyclone and the quencher is of great significance.

It is suggested in German Pat. 1,052,396 that the discharge duct should be as short as possible and should extend vertically into the quencher, in which the high-velocity gas jet is quenched by horizontal oil jets from all sides. This mode of operation has the disadvantage that in periods in which the gas velocity is reduced, oil can enter the discharge duct and form disturbing coke deposits. Such a reduction of the gas velocity may be due to disturbances in operation. The discharge duct is preferably circular in cross-section. A deflection from the vertical by at least 45° involves a risk of turbulence with an increased formation of deposits at the vertex of the pipe bend. For this reason, the invention proposes that the mean radius of curvature should be 4–6 times the diameter of the discharge duct at the outlet from the separating cyclone. Besides, a velocity of 30–100 meters per second, preferably 40–60 meters per second, is imparted to the cracked gases at the inlet of the quencher. For this purpose, the outlet passage of the discharge duct is conically tapered accordingly. In some cases it has been found desirable to provide an outlet opening which is similar to a diffuser and to provide guide vanes in the outlet passage in order to suppress the formation of large eddies.

The ducts between the reactor and the cyclone and between the cyclone and the quencher are desirably flanged. Cleaning work, when required, will be facilitated by a removal of sections of the duct and may be carried out within a short time without need for a person to enter the equipment, which would have to be highly cooled for this purpose. The removal of duct sections will be facilitated if the removable duct sections consist of alloy sheet and are surrounded by a gas-tight shell of ordinary sheet steel whereas the annular space is lined with an insulating shell having a light tamped weight.

Deposits in the ducts and the cyclone are mainly the result of a formation of cracked coke in secondary reactions. This phenomenon may be substantially suppressed, by experience, if the temperature of the cracked gases leaving the reactor is lowered by 50–300° C., preferably 100–200°. This may be accomplished in a simple manner if the transfer duct connected to the reactor contains nozzles for spraying water, preferably by means of steam. The evaporation of said water results in the desired decrease of the temperature of the cracked gases. Where this step is adopted, care should be taken that water does not splash against the walls because such wetted areas may be subjected to subcooling resulting in a condensation of oil followed by a cracking reaction with formation of coke. Instead of water, gasoline liquid or vapor may be injected so that there is not only a cooling action but that gasoline is slightly cracked and this cracking results in a higher yield of olefins and aromatized liquid hydrocarbons.

In the following example, the operation of the apparatus of this invention is illustrated and is not intended to limit or restrict the spirit or scope thereof.

Sahara crude oil at a rate of 50 metric tons per hour is preheated to 360° C. in a preheater and separated in a cyclone into a vapor phase and a liquid phase. The vapor phase at a rate of 27.5 metric tons per hour is fed to the reactor through forty individual nozzles together with process steam at a rate of 12 metric tons per hour. Each individual nozzle is provided in the inlet conduit for the hydrocarbons and in the inlet conduit for the process steam with an orifice plate so that the hydrocarbons and process steam are distributed in a desirable manner to the individual nozzles. The liquid phase of the hydrocarbons at a rate of 22.5 metric tons per hour is supplied to the reactor through twenty additional individual nozzles in conjunction with process steam at an additional rate of 12 metric tons.

The reactor has an inside diameter of 5.2 meters and the sixty individual nozzles are uniformly distributed over its cross-section with a spacing of about 300 millimeters. Nozzles for supplying only process steam at a rate of 6 metric tons per hour are disposed between and equal in number to the individual nozzles for the supply of hydrocarbons. The latter steam serves for a slight agitation and corresponds to a steam velocity of 0.3 meter per second based on the inside cross-section of the reactor. The fluidized bed in the reactor has a height of 1000 millimeters and the gas space above the fluidized bed a height of 1200 millimeters.

Sand having a preferred particle size range of 0.2–1.2 millimeters is fed to the reactor at a rate of 450 metric tons per hour and at a temperature of 850° C. Sand at a temperature of 740° C. flows from the reactor at a rate of 445 metric tons to the conveying and heating line. 5 metric tons of dustlike sand are entrained per hour by the cracked gases rising from the fluidized bed of the reactor and carried into the cyclone, in which sand at a rate of 4.8 metric tons per hour is separated and returned into the sand cycle. Sand dust at a rate of 0.2 metric ton per hour is scrubbed in the quencher from the cracked gases by the circulating oil. This sand-laden circulating oil is preferably used to heat the conveying and heating line, desirably after a concentration of the solids in hydrocyclones.

The cracked gases formed in the fluidized bed of the reactor together with the hydrocarbon vapors and the process steam are available at such a rate that they rise from the fluidized bed of the reactor at an average velocity of 2.5 meters per second, based on the inside cross-section of the reactor. They are accelerated to 10 meters per second at the inlet of the transfer duct and the duct is constantly tapered so that the gas velocity is increased to 20 meters per second as the gases enter the cyclone. They leave the cyclone at a velocity of 25 meters per second and enter the quencher at a velocity of 50 meters per second.

We claim:
1. Apparatus for cracking hydrocarbons to form olefins comprising
   (a) a fluidized bed reactor including heat carriers;
   (b) lateral outlet conduit means connected to the lower portion of the fluidized bed of said reactor adapted to feed said heat carriers to vertical pneumatic means adapted to elevate and heat said heat carriers;
   (c) means for separating said heat carriers from the conveying and heating gases;
   (d) means for supplying said heat carriers to said reactor;
   (e) cyclone separating means;
   (f) quenching means;
   (g) a first group of spaced apart nozzle means extending through the bottom of the reactor and distributed thereover, each nozzle of said first group having individual inlet conduits connected to a distributing system for the hydrocarbons to be cracked and individual inlet conduits connected to a first distributing system for process steam;
   (h) a second group of spaced apart nozzle means extending through the bottom of the reactor and distributed thereover, the nozzles of said second group being positioned in the spaces between the nozzles of said first group, each of the nozzles of said second group having individual inlet conduits connected to a second distributing system for process steam;
   (i) transfer duct means between the reactor and the cyclone means; and
   (j) discharge duct means between the cyclone means and the quenching means.

2. Apparatus of claim 1 wherein the bottom of said reactor is flat.

3. Apparatus of claim 1 wherein said lateral conduit means and said means for supplying said heat carriers to said reactor are located on opposite sides of said reactor.

4. Apparatus of claim 1 wherein the distributing system for the hydrocarbons is adapted to supply a portion of the first group of nozzle means with vaporous hydrocarbons and the remaining portion with the liquid hydrocarbons.

5. Apparatus of claim 1 wherein the distributing system for the hydrocarbons is adapted to supply hydrocarbons in the form of vapor and liquid to the first group of nozzle means of said first group.

6. Apparatus of claim 1 wherein the groups of nozzle means are adapted to be removed from the bottom of the reactor.

7. Apparatus of claim 1 wherein the individual inlet conduits of the groups of nozzle means have cleaning openings.

8. Apparatus of claim 1 wherein the individual nozzles of said groups of nozzle means are spaced 100–500 millimeters apart.

9. Apparatus of claim 1 wherein the second distributing system is adapted to supply steam to the second group of nozzle means at a rate such that the velocity in the fluidized bed is 1–3 times the minimum fluidizing velocity for the fluidized solids.

10. Apparatus of claim 1 wherein said groups of nozzle means have upwardly directed outlet passages having an included angle of 10–40°.

11. Apparatus of claim 1 wherein said groups of nozzle means are covered on top and have horizontally or downwardly directed outlet passages.

12. Apparatus of claim 1 wherein the gas space above the fluidized bed in said reactor has a height of 0.5–2.0 meters.

13. Apparatus of claim 1 wherein the transfer duct means progressively decreases in cross-section from the reactor to the cyclone means and deflects into a horizontal direction before entering the cyclone means.

14. Apparatus of claim 13 wherein the transfer duct means in cross-section consists of an upright rectangle which continuously decreases in height.

15. Apparatus of claim 14 wherein the cross-section at the beginning of said transfer duct means at said reactor is about ¼ to ⅙ of the cross-section of the reactor and decreases in size toward its outlet.

16. Apparatus of claim 14 wherein the inlet of said transfer duct means at said reactor is approximately parabolically curved.

17. Apparatus of claim 14 wherein said transfer duct means bends into a horizontal direction and the radius of curvature of the bend of the narrow side of said duct means is approximately constant in the range of $$0.5 \frac{D_R}{a} \text{ to } 0.9 \frac{D_R}{a}$$

where $D_R$ is the cross-section of the reactor.

18. Apparatus of claim 1 wherein the discharge duct means tapers from the cyclone means to the quenching means and opens laterally into the quenching means with an inclination of at least 45° from the vertical.

19. Apparatus of claim 1 wherein the discharge duct means is provided at its lower end in said cyclone with a dip pipe, the inlet edge of said dip pipe in said cyclone being flared on the outside or having an internal bead.

20. Apparatus of claim 18 wherein said discharge duct means is circular in cross-section and has a mean radius of curvature 4 to 6 times the diameter of said discharge duct means at the outlet of said cyclone.

21. Apparatus of claim 1 wherein said transfer and discharge duct means are flanged and consist of an alloy sheet provided with a gas-tight outer shell of sheet steel and intermediate insulation.

22. Apparatus of claim 1 wherein means are provided for spraying water or gasoline in a liquid or vaporized state in the gas space of said reactor or at the beginning of the transfer duct means.

23. Apparatus of claim 1 wherein said second group of nozzles is disposed below the first group of nozzles.

References Cited

UNITED STATES PATENTS

| | | | |
|---|---|---|---|
| 2,385,446 | 9/1945 | Jewell et al. | 23—288 S |
| 2,729,428 | 1/1956 | Milmore | 165—2 |
| 2,422,501 | 6/1947 | Roetheli | 23—262 |
| 2,610,842 | 9/1952 | Schoenmakers et al. | 23—288 S |
| 2,809,023 | 10/1957 | Schoenmakers et al. | 263—21 A |
| 1,798,510 | 3/1931 | Winslow et al. | 55—459 X |
| 2,781,251 | 2/1957 | Howell | 23—262 X |

JAMES A. TAYMAN, Jr., Primary Examiner

U.S. Cl. X.R.

23—277 R, 284, 288 S, 1 F; 263—21 A; 208—48 Q, 106, 127; 55—459; 165—104